(12) United States Patent
von Schlegell et al.

(10) Patent No.: US 8,132,245 B2
(45) Date of Patent: Mar. 6, 2012

(54) LOCAL AREA NETWORK CERTIFICATION SYSTEM AND METHOD

(75) Inventors: Victor von Schlegell, Traverse City, MI (US); Girish Nayak, Traverse City, MI (US)

(73) Assignee: Appia Communications, Inc., Traverse City, MI (US)

( * ) Notice: Subject to any disclaimer, the term of this patent is extended or adjusted under 35 U.S.C. 154(b) by 1273 days.

(21) Appl. No.: 11/747,103

(22) Filed: May 10, 2007

(65) Prior Publication Data

US 2007/0266254 A1 Nov. 15, 2007

Related U.S. Application Data

(60) Provisional application No. 60/746,909, filed on May 10, 2006.

(51) Int. Cl.
*H04L 29/06* (2006.01)
(52) U.S. Cl. ........... 726/10; 726/4; 726/6; 726/7; 726/8; 726/9; 726/11; 726/12; 726/26; 726/27; 726/28; 726/29
(58) Field of Classification Search ............ 726/4, 6–12, 726/26–29
See application file for complete search history.

(56) References Cited

U.S. PATENT DOCUMENTS

| 6,948,070 | B1 | 9/2005 | Ginter et al. | |
|---|---|---|---|---|
| 2004/0078573 | A1* | 4/2004 | Matsuyama | 713/175 |
| 2005/0204050 | A1* | 9/2005 | Turley et al. | 709/229 |
| 2005/0228886 | A1* | 10/2005 | Cain et al. | 709/226 |
| 2006/0064469 | A1* | 3/2006 | Balasubrahmaniyan et al. | 709/218 |
| 2007/0064673 | A1* | 3/2007 | Bhandaru et al. | 370/351 |

OTHER PUBLICATIONS

Navarro et al., "Contrained delegation in XML-based Access Control and Digital Rights Management Standards," In: Proceedings of the IASTED International Conference on Commnication, Network, and Information Security, New York, USA (2003).*
Godavari et al., "Secure Information Sharing Using Attribute Certificates and Role Based Access Control", 15 pages, (2005), http://cs.uccs.udu/~infoshare/doc/sdcs2005/sis-sdcs2005.pdf.*
Stepen Woodall, "Firewall Design Principles", 8 pages, (2004), http://www4.ncsu.edu/~kksivara/sfwr4c03/projects/SteWoodall-Project.pdf.*
"AppiaSecure Network Security," downloaded from http://www.appiaservices.com/services/indexlinkappiasecure.html on Jul. 31, 2007.
"AppiaSecure Network Security Brochure," downloaded from http://www.appiaservices.com/services/includes/pdf/services_security.pft on Jul. 31, 2007.

* cited by examiner

*Primary Examiner* — Vivek Srivastava
*Assistant Examiner* — Hee Song
(74) *Attorney, Agent, or Firm* — Vedder Price P.C.

(57) ABSTRACT

The disclosure herein relates to an improved local area network certification system, apparatus, and method. More particularly, the disclosure relates to a certification-based system, apparatus, and method where a certification authority issues and manages a first certification and grants LAN Information Technology Executives and Network Administrators the capacity to request and store on a local gateway User-Specific, Permission-Coded Certificates to control the transfer of data within the LAN and with external sources.

30 Claims, 8 Drawing Sheets

LOCAL AREA NETWORK CERTIFICATION SYSTEM AND METHOD

REFERENCE TO RELATED APPLICATION

The present patent application claims priority from and the benefit of U.S. Provisional Patent Application No. 60/746,909, filed May 10, 2006, entitled LOCAL AREA NETWORK CERTIFICATION SYSTEM AND METHOD, which prior application is hereby incorporated herein by reference.

FIELD OF THE DISCLOSURE

The disclosure herein relates to an improved local area network ("LAN" or "LANs") certification system, apparatus, and method. More particularly, the disclosure relates to a certification-based system, apparatus, and method where a certification authority ("CA") issues and manages a first certification and enables LAN Information Technology Executives ("ITE" or "ITEs") to request and store on a local gateway User-Specific, Permission-Coded Certificates ("USPCC" or "USPCCs") and to issue to Network Administrators ("NA" or "NAs") privileges to control the transfer of data within the LAN, between the network and external sources, and between external users and LAN-based users.

BACKGROUND

Reliance on computing devices such as computers, personal data assistants, wireless phones, and other systems in the workplace continues to increase. Use of computing devices such as desktop computers, laptop computers, personal data assistants, and the like are commonplace in the workplace. These devices are becoming more sophisticated and generate requests for an ever widening variety of information sources using a variety of protocols. With this increased access comes security risks, viral invasions, corporate espionage, abuse of systems, and network instability. Also, marketers manipulate this vulnerability in an effort to reach users and send them unwanted e-mail and other e-publications.

Owners of LANs must balance between granting employees unfettered access to the Internet, such as the use of localized e-mail software, remote e-mail provided by a service provider, or even file sharing. To restrict Internet connections often results in restricting employee access to valuable work tools, which hinders work performance. Unrestricted access may result in abuses, leaks of information, and corporate espionage. Restricted access may require setting up password protections, only granting access to approved sites and approved users, and deploying resources to secure networks and data. For instance, owners of LANs must find indirect ways to restrict access to an on-line auction website while allowing the same individual to purchase plane tickets for employers or employees on a substantially similar website. Owners must allow salesmen to access product pricing information while preventing other employees from doing so, all under the umbrella of a single network. With this increased access have come security risks, such as viruses and worms, corporate espionage, hacking, "spam," and other types of abuses. Exploitation in light of these risks can be extremely costly and even threaten the survival of companies and organizations. LAN NAs may also wish to share part of the information found and stored on the LAN with external users without unwillingly granting access to other parts of the core proprietary business information stored on the LAN. Currently, hardware such as firewalls offers limited connection control regardless of the type of data requested or if a user is allowed or accredited by the LAN NA to access the data.

In tandem with increased technological demands and data growth, the need for LAN ITEs and NAs to provide increased security and control access of LAN users increases proportionally. LAN ITEs and NAs must be able to grant partial access to users based on certain predetermined parameters. For example, a first user may be given unrestricted rights to surf the Internet, another be granted the limited right to send but not receive e-mail attachments, while yet another user may be restricted to use where files can only be downloaded and stored on a local server. Network owners need to decide how "open" or "closed" their networks will be. The more open a network is, the more access users have to the information they need, but the more vulnerable the network is to the problems mentioned above. Conversely, a closed network is less vulnerable, but it is also less usable by both a local LAN user and an external network user trying to access data located on the LAN.

LAN ITEs and NAs must be able to authenticate users logging into the LAN to control the data stream by assigning each user limited access in a secure fashion. To protect data and restrict access to protected information, LAN NAs must also ensure that no user is able to obtain valuable trade secrets by falsifying an identity or logging into the LAN after the termination of employment. LAN ITEs and NAs must also control so that when outside access is granted, it is carefully done instead of simply having to select if access is granted to an outside user or if the access is denied.

Some enterprises have implemented collaborative web services with the goal of creating a web services interface across trusted domain boundaries to reduce unnecessary barriers. Those techniques have been used to reduce authentification burdens on users and computer systems administrators. Under the single sign-on ("SSO") process, a new user is required to enter information in a data field and to be validated by the domain owner. Once accomplished, a temporary password and a code name is provided to the user. Many websites where monthly memberships are required operate under this model. Users are granted a specific level of access, and if the password is stolen or lost, the network then becomes vulnerable. For instance, if a newspaper sells an on-line subscription to a user, it is frequently unable to grant limited access to its content, and to determine if the user is in fact the right individual, the server owner may control the location from which access is obtained, and most importantly, determine whether multiple users are jointly using the same password from different locations.

Network owners have controlled access from outside their organizations by using firewalls with basic port connectivity access, and from within their organizations by limiting which application are installed on user devices. These device-level solutions are easily circumvented; even an inexperienced user can install an e-mail client or web browser or gain access to a device that has these applications installed. Passwords are also notoriously easy to discover. To address the shortcomings of the many existing traditional approaches, key-based cryptography algorithms have been developed.

Generally these cryptographic algorithms are either symmetric, where a key can both encrypt and decrypt a message, or asymmetric, where a public key is used to encrypt a data stream and a private key is used to decrypt the same stream. The use of symmetric systems presents serious limitations. These systems require significant processing time to determine prime number sequence keys, which must be updated continuously to prevent newer and more powerful systems from reconstructing the sequences. In addition, once a key is lost or stolen, the chain of data transfer is corrupted and must be replaced.

The latest version of cryptographic systems, based on asymmetric algorithms like Pretty Good Privacy™, use a public key infrastructure ("PKI"). These systems also use hash functions and symmetric functions. In PKI, the public key is used and distributed to establish a secure data communication channel thought key exchanges among the users. Each user is given a private and a public key. The public key is shared, whereas the private key must be held in confidence. If a user loses his private key, only a single new public key associated with that particular user must be recalculated.

A LAN NA wishing for users to communicate securely needs to provide and/or manage private and public keys for all users, creating an additional security risk. In a secure communication, a party uses the other party's public key to encrypt the message to be decrypted by the other party. The use of PKI creates a new problem: how can a user know he is using a second user's public key, not that of a third party? If a pirate substitutes a recipient's public key with his own public key, the sender is fooled into encrypting the data in such a way that only the pirate is able to read. Authentification of public keys has become a necessary part of secure transactions, and one of the most common solutions is the use of digital signatures.

A neutral third party, called a Certification Authority ("CA"), is able to maintain an index of public keys and serves to certify a public key by encrypting it with its own public key. A user applies for a digital certificate from the CA, requesting a target public key. Upon verification of the identity of the requestor, the CA sends a digital certificate. Current standards for issuing a digital certificate are X.500 and X.509. The certificate normally contains information such as the signature of the CA, the public key desired, and the identity of the CA. Using the public key of the CA, the user then decrypts the certificate to extract the desired public key.

A digital signature is a code that can be attached to an electronically transmitted message to guarantee that the sending party is really who he claims to be. Most PKI-based certificates use a private key to create a hash value generated with the message, which is called the digital signature. Without the digital signature, it is still possible for a pirate to interfere with the encrypted message by removing lines within the unknown text. By using the hash table along with the digital signature, once an entity receives an encrypted message, the user is then able to recreate the hash table by applying the public key to the encrypted message and use the CA's public key to verify the completeness of the encrypted data. The hash table allows for verification of noninterference with the encrypted data, though the private key is still required by the recipient to decrypt the data stream.

As a result of this well-established PKI and Certification system, a plurality of public and private keys must be managed to send and receive information from a plurality of sources. In addition, the services of a CA must be used to validate each user's public keys. Such security management can prove to be burdensome, and it becomes even more so when the keys are compromised and must be managed from within a LAN for users requesting information from numerous external sites. Site security-management designs often result in an all-or-nothing grant of access for external users, this user either possesses a digital certificate to access an application and a password to logon past the firewall.

What is needed is a system that allows a LAN ITE and NA to increase LAN security by offering local CA-type possibilities to users of a LAN and to uses external to the LAN on a remote network. To accelerate the complicated permissions system granted to a plurality of users, each having different authorization levels, the disclosure must allow LAN ITEs and NAs to issue individual permissions and certificates while working closely in relationship with a CA as a third party. What is also needed is a system to manage public and private keys on a local level to enable association of protection levels based on file type, file protocol, or even file name specificities.

The system must also enable NAs and ITEs to protect their LANs against internal and external threats, and in doing so, control the flow of information and how open or closed the networks are to any type of user such as local LAN users and remote network users. The system must control the spread of viruses, worms, and must forestall the interference of hackers and pirates. The system must also prevent users from accessing unauthorized data and sharing such information on local servers. The disclosure also relates to a system to increase productivity by preventing a high volume of spam and unauthorized use by employees of websites, personal e-mail, and chat.

SUMMARY

This disclosure describes a system, apparatus, and an associated method of use where two servers, a remote Certificate Server ("ACS") and a LAN Gateway ("ASG"), are used in tandem to globally and locally manage security over a LAN by controlling and restricting the transfer of data between the communication devices of local LAN users and users on a remote network. The system allows members, such as owners, and ITEs, such as a Chief Information Officer or a Chief Technology Officer, to assign privileges to local NAs, who in turn are able to issue permissions to be associated with individual users. These permissions are sent by the ASG to the ACS for creation of a USPCC, which is then returned and stored by the ASG. Owners and ITEs are also able to select a list of external websites, domains, and networks to which users of the LAN may be granted access based on individual permission levels. The list of these accessible external resources are stored on the ACS and copied to the ASG for storage and indexing.

Finally, the use of an ASG equipped with copies of certificates and USPCCs coded with permissions allows NAs and ITEs to regulate the incoming or outgoing flow of information within the LAN and external resources, manage the validity of these permissions, and use the access device to effectively complement any LAN firewall capabilities.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION

Figure 1:
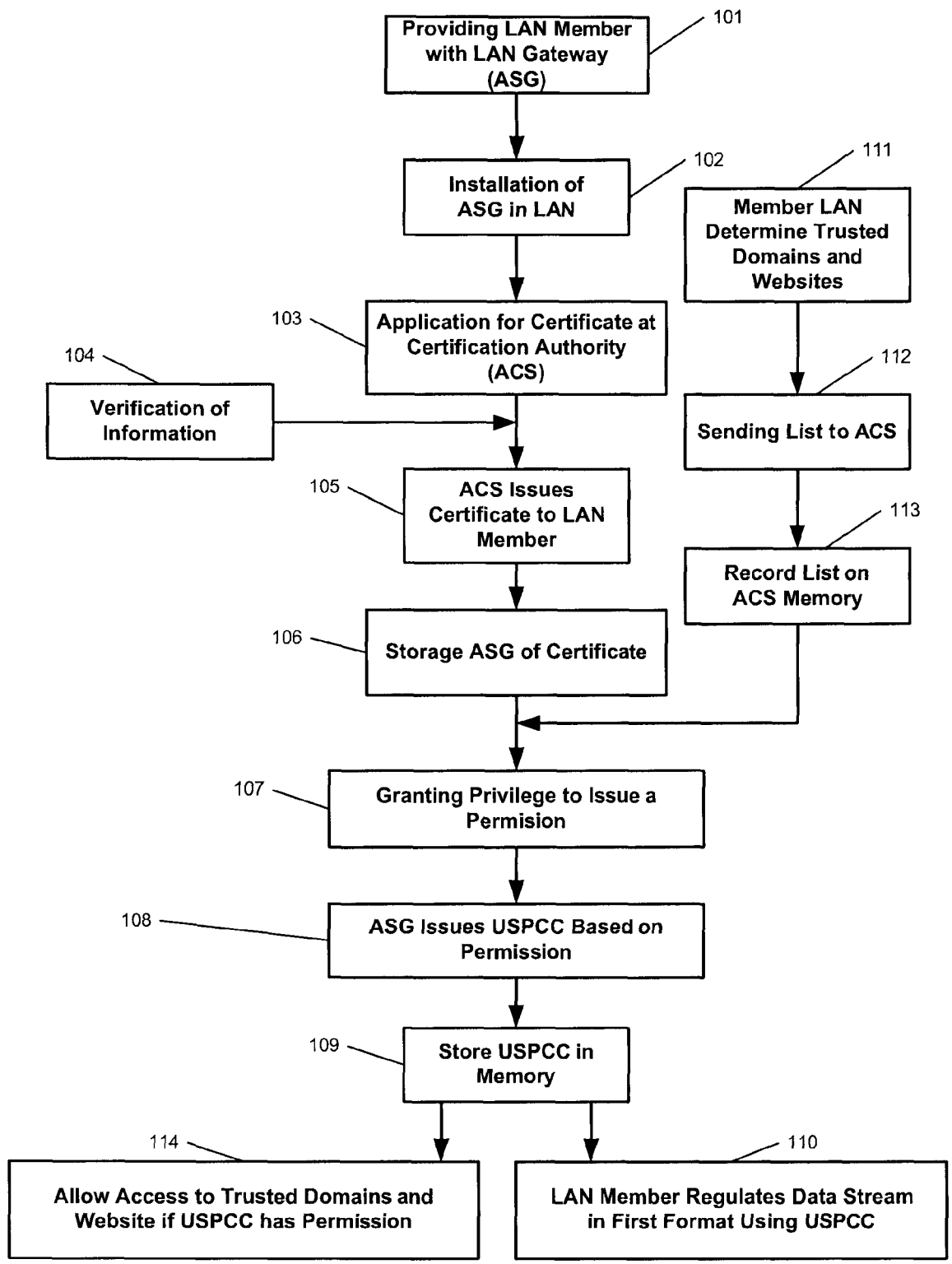
FIG. 1 is a flowchart illustrating the steps associated with the method for managing the transfer of data over networks using certification technology.

For the purposes of promoting and understanding the principles disclosed herein, reference will now be made to the preferred embodiments illustrated in the drawings and specific language will be used to describe the same. It is nevertheless understood that no limitation of the scope is thereby intended. Such alterations and further modifications in the illustrated device and such further applications of the principles disclosed as illustrated therein are contemplated as would normally occur to one skilled in the art to which this disclosure relates.

The present disclosure relates to the method of management of a LAN using certification technology and an apparatus used to manage the transfer of data over the LAN and a remote network. In the initial part of this disclosure, a method is described and in the subsequent part, the apparatus as partially disclosed in the method is fully disclosed. One of ordinary skill in the art understands that any different and potentially conflicting understandings resulting from this disclosure between elements and limitations disclosed in relationship with the method and the apparatus must be construed coherently within the respective section of the specification in which it is disclosed.

FIG. 1 illustrates a flowchart for a method for managing the transfer of data over a LAN and a remote network using certification technology. The different suggestive steps of the method are shown in sequential order in rectangular boxes and are separated by directional arrows in an effort to convey a suggested sequence of the different steps. What is understood by one of ordinary skill in the art is that the different steps are generally directed to the processing and flow of data over a local or a remote network at the request of a user. The dynamics associated with the flow of data must be understood and construed broadly and based on broad conceptual definitions of each term and limitation. By way of nonlimiting example, when the step of storage of data in memory is disclosed, what is contemplated is the use of permanent, impermanent, transitory, or even remote memory such as RAM, ROM, hard drives, portable drives, flash drives, floppy disks, CD-ROMs, or any other type of storage medium in or on which information can be stored. By way of a second nonlimiting example, when a server is disclosed, what is contemplated is the use of any central processing unit capable of offering either independently or in conjunction with other units the capacities and functions generally associated with a server with the understanding that miniaturization and increases in efficiency are ever present in this art. For example, the use of a personal digital assistant (PDA) or a cell phone as a remote server is contemplated, and the use of a LAN made of a series of handheld portable wireless devices is also contemplated.

Figure 3:
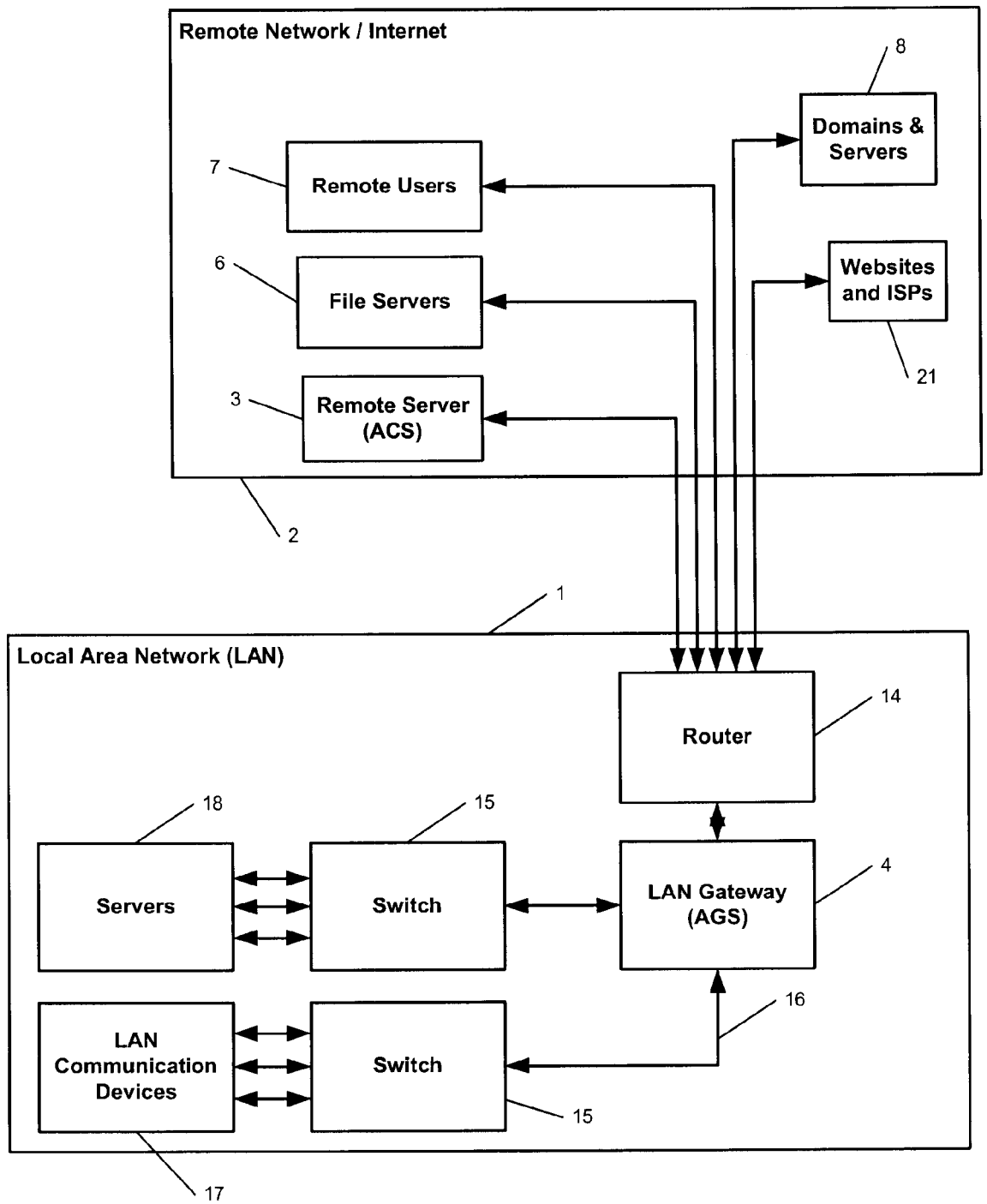
FIG. 3 is a flowchart illustrating the data transfer and storage associated with the apparatus for managing the transfer of data over a LAN and a remote network in conjunction with a Certification Authority over a LAN using certification technology.

The method includes the step of providing a LAN member 101 with a LAN gateway or as also described herein as an ASG 4 to be installed 102 on the LAN 1 shown as an apparatus in FIG. 3. In one preferred embodiment, the LAN member 101 is either an information technology executive ("ITE"), such as a Chief Information Officer or a Chief Technology Officer, or a Network Administrator ("NA"). It is understood by one of ordinary skill in the art that while a distinction exists between corporate officers and network administrators, any other type of hierarchical relationship between the different corporate actors within the structure is conceivable. It is within the teachings of the present disclosure that the terms "LAN member" or "LAN owner" may be used interchangeably and without limitation.

The ASG 4 may be installed on a LAN 1 where a plurality of LAN communication devices 17 are assembled in data communication with the ASG 4 and ultimately with the external network 2. One of ordinary skill in the art understands that while a spider web type of network is disclosed having the ASG as the central node, what is contemplated is the use of any type or architecture of network capable of having an ASG 4 in data communication with the different terminals or LAN communication devices 17 within or outside the network. What is also contemplated is a broader type of LAN network where different subnodes or different architectures are equally designed to efficiently function as a LAN. While a physical embodiment is shown, what is also contemplated is the use of digital data structures and software capable of acting as a LAN and offering the different functions associated with the ASG 4 and the LAN communication devices 17.

Figure 4:
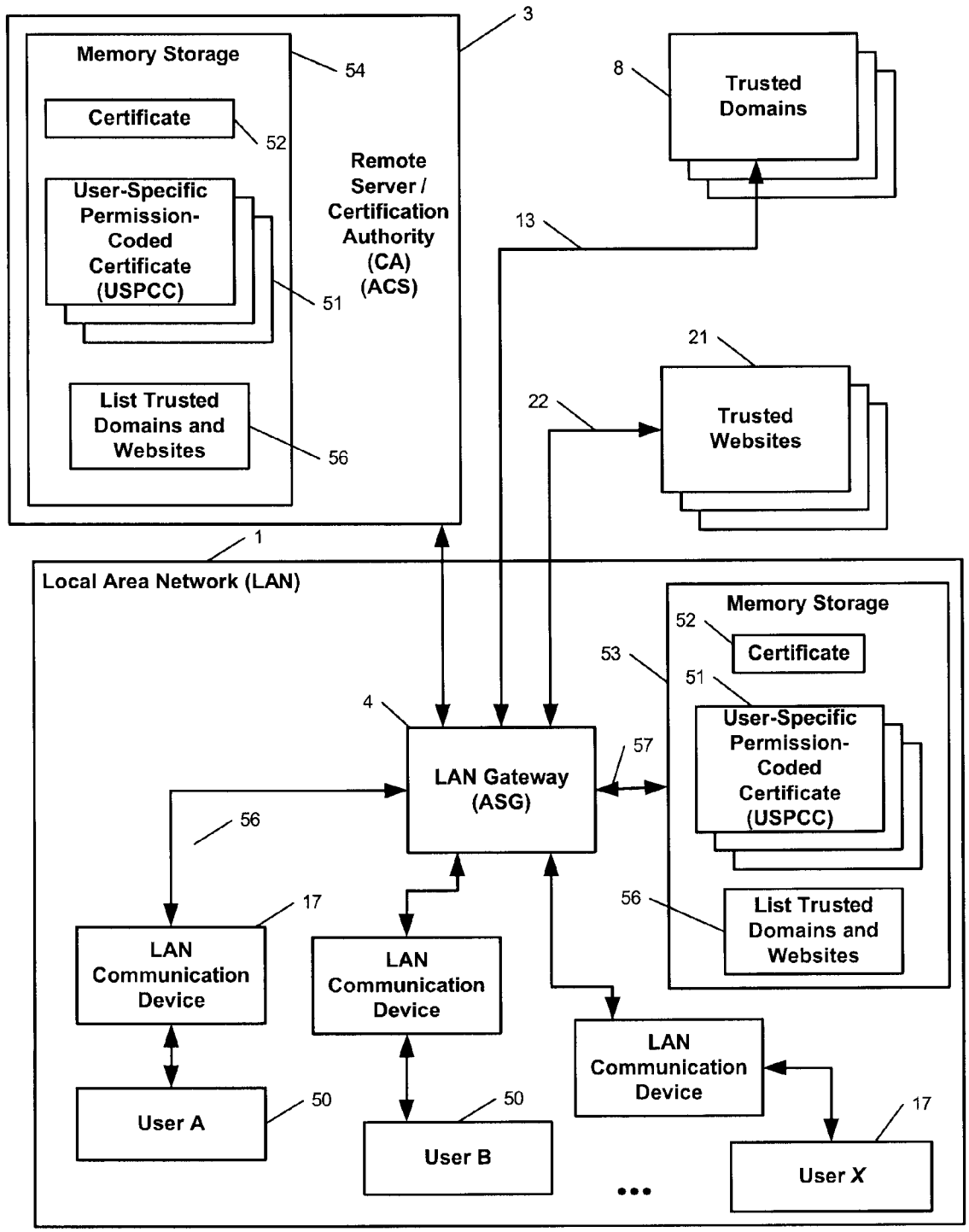
FIG. 4 is a flowchart illustrating the elements of an apparatus for managing the transfer of data over a LAN and a remote network using certification technology.

Next, the LAN member or a remote user is able to apply for a certificate 103 at a certification authority ACS 3 for each of a plurality of users 50, 7 of the LAN 1 or the remote network 2 as shown in FIG. 4. In one embodiment, the LAN member transfers the appropriate digital request from either one of the LAN communication devices 17 or from a LAN member user interface located directly on the LAN gateway 4 to the ACS 3 or from a remote terminal used by a remote user 7 located on the remote network 2. Issued certificates from the certification authority ACS 3 are then sent and managed 105 at the LAN gateway 4. In an alternate step, the information provided by the LAN member is verified 104 before the certificate can be issued by the ACS 3 and sent to the LAN gateway 4.

Figure 5:
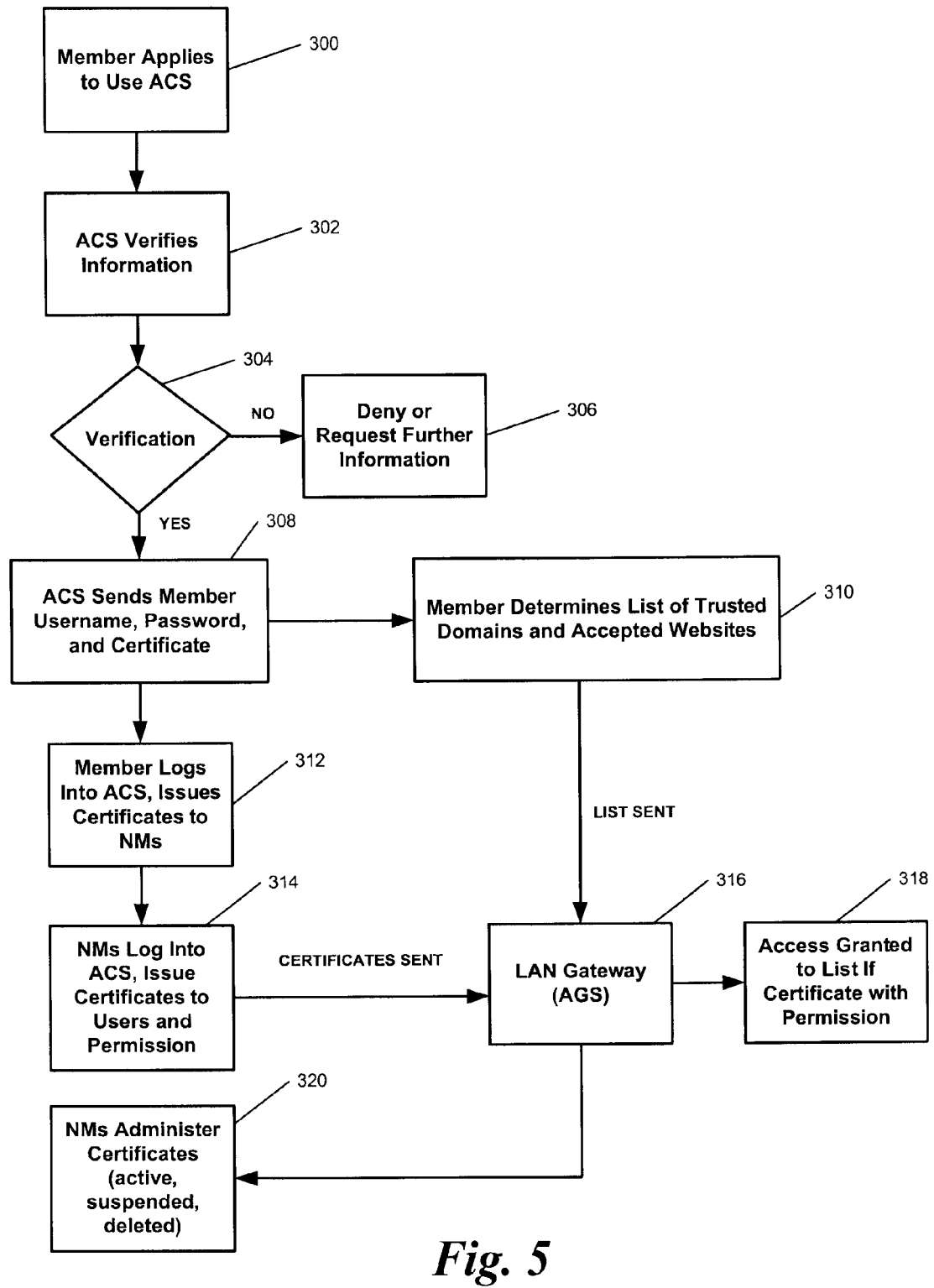
FIG. 5 is a flowchart illustrating the different privileges and permissions associated with the method and apparatus for managing the transfer of data over a LAN and a remote network using certification technology.
Figure 6:
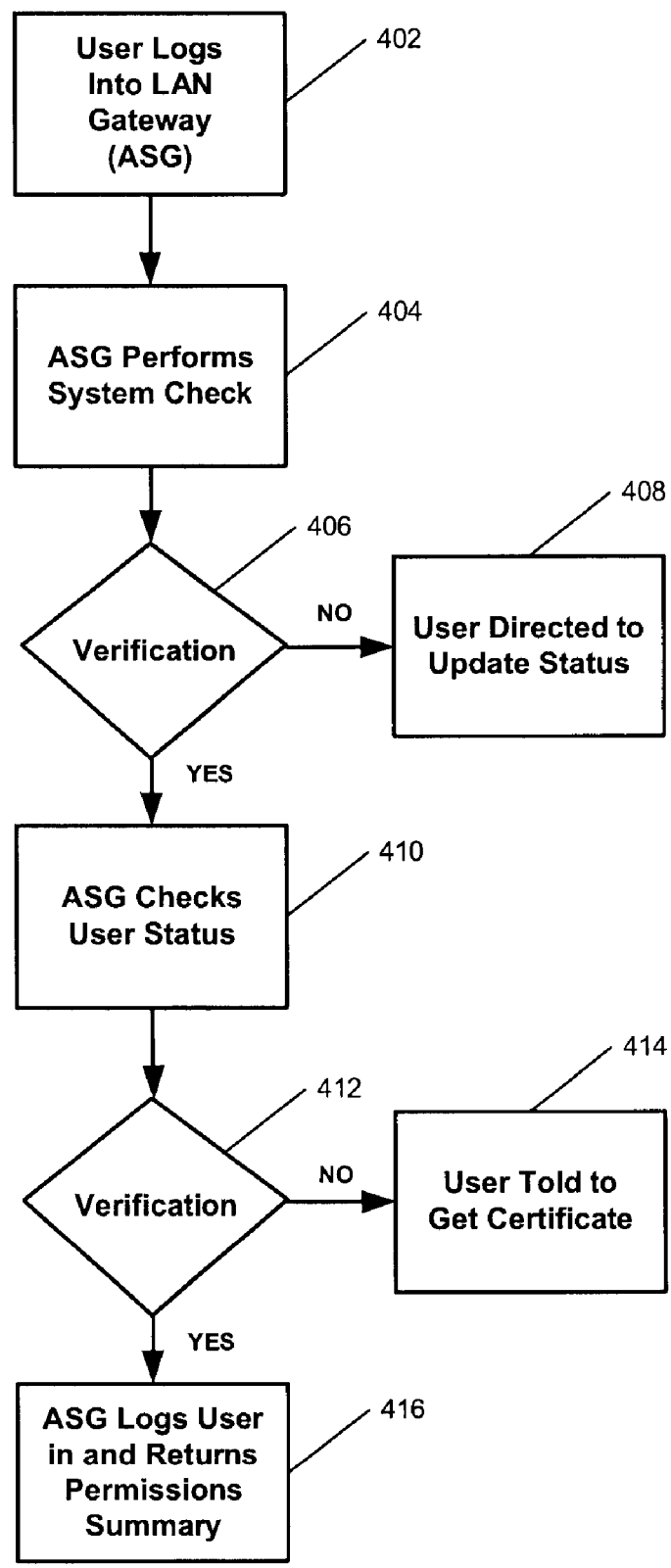
FIG. 6 is a flowchart illustrating the different steps associated with logging into the ASG in association with the method and apparatus for managing the transfer of data over a LAN and a remote network using certification technology.

Software, when implemented in a fashion as disclosed herein, is associated with a plurality of alternate functions that correspond to different subroutines of the overall general disclosure. Alternate functions associated with the LAN member information verification are shown in FIG. 5. FIG. 6 shows how a LAN member can obtain as a user permission summary after verification is conducted by the certification authorities. FIG. 5 is a flowchart illustrating the different privileges and permissions associated with the method and apparatus for managing the transfer of data over a LAN using certification technology. FIG. 6 is a flowchart illustrating the different steps associated with logging into the ASG 4 in association with the method and apparatus for managing the transfer of data over a LAN using certification technology. FIG. 5 discloses a method for granting a LAN communication device 17 user access to a list of trusted domains and accepted websites 8, 21 as shown in FIGS. 3-4. The method includes allowing a member 300 to apply to a remote server such as an ACS 3 for issuance of a plurality of certificates, conducting a verification 302 of the information by the remote server or ACS 3 of the member application 304 information and responding to the member 308 with a username, a password, and a certificate only if the verification is successful. In the case that verification is unsuccessful, the ACS 3 responds to the user by denying the request or requests further information 306.

As shown in FIG. 5, after the ACS 3 sends member information, members 310 must determine a list of trusted domains and accepted websites, which are then sent directly to the LAN gateway 4. In parallel, members are allowed 312 to log into the remote server for issuance of certificates to a LAN executive or manager where the remote server 3 issues a USPCC 51 back 316 to the LAN gateway 4. Finally, the LAN gateway, armed with the member designated list 310 and the USPCC 51 associated with a user, is able to grant access 318 to the list of trusted domains and accepted websites determined by the member.

In an alternate embodiment, the method includes the step of allowing the LAN executive or manager to administer 320 the different certificates and USPCCs 51 and where the different certificates 52 are either active, suspended, or deleted. In yet another embodiment, as shown in FIG. 6, the remote server 3 provides users with a permission summary 416 after validating a system check 406 and confirming 412 the user status using the certificate 52.

Figure 2:
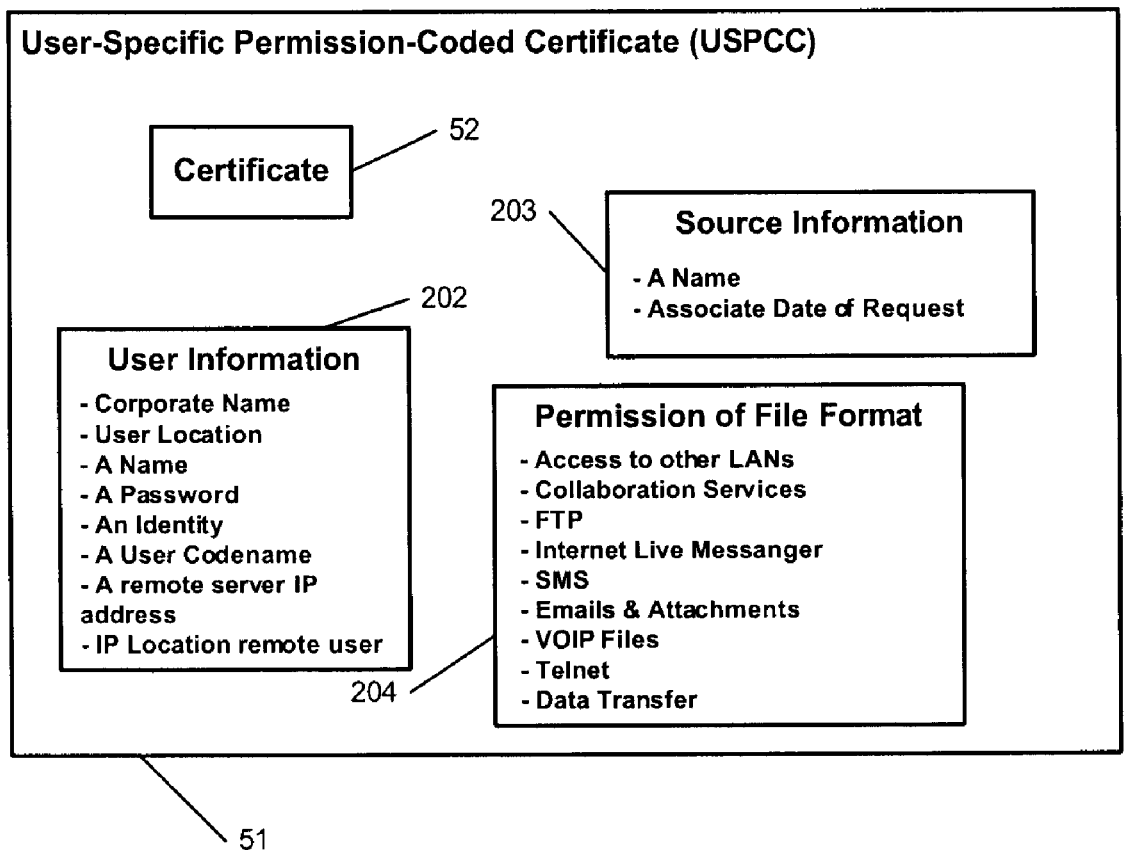
FIG. 2 illustrates the data structure of the user-specific, permission-coded certificate created at the request of a LAN NA based on a certificate issued by the Certification Authority.

In another step of one embodiment of the method as shown in FIG. 1, the ACS 3 stores a copy 106 of the issued certificate 52 within a local or a first memory 54 of the remote server 3. Once the certificate is stored, it is sent to the ASG 4 and stored in the second memory 53 for further use. The ACS 3 then grants 107 a member of the LAN 1 a privilege to issue a permission 204, as shown in FIG. 2, as part of the USPCC 51 relating to a capacity by at least one user 50 of a LAN 1 to transfer a stream of data 56 in a first format using a LAN communication device 17 or to at least one remote user 7 of a remote network 2. In another step, the USPCC 51 is stored 109 in the first memory 54 and the second memory 53.

In one embodiment, the permission 204 issued by an NA as shown in FIG. 2 relates to different users and applications either located on a LAN 1 or on a remote network 2. It is understood by one of ordinary skill in the art that data relates to any type of data stream originating from digital and non-digital mediums sent digitally over a LAN, a remote network, a global Internet-type network, or any other suitable network medium. The data can include a plurality of streams relating to numerous users of communication devices within or outside a LAN and can include data used or processed by the access to a LAN server, the access to file servers, the use of collaboration services such as WebEx, GotoMeeting, the File Transfer Protocol, Internet Messaging, reception of e-mail without or with attachments, sending of e-mail without or with attachments, the use of voice-over-internet files, telnet, web access, data transfer, or the like.

The next step 110 of the method as shown in FIG. 1 provides for allowing a user 50 of the LAN 1 or outside of the LAN 1 the capacity to transfer a stream of data in a first format to or from the at least one LAN communication device 17 or remote device used by a remote user 7 if it coincides with the format allowed and imbedded in the USPCC 51 as the permission. In addition, in another embodiment of the present method, the disclosure may further comprise the steps of allowing the member to determine a list of trusted domains 111 and accepted websites to be accessed by the at least one user of the LAN 1. A list of trusted websites and domains 56 as determined by a member of the LAN 1 is sent 112 and stored 113 on the first memory 54 of the ACS 3 and possibly the second memory 53 of the ASG 4. The ASG 4, when receiving a certain data transfer request, determines if the request coincides with the format allowed under the permission 204 associated with the USPCC 51 stored in the local memory 53 of the ASG 4, a user 50 within the LAN 1 for a website 21 or a domain 8 or any other remote location 7, 6 located on the external network 2 and determines if the user has the right to access the location and alternatively to receive information from the location 114.

In one preferred embodiment, an ITE is granted a first level of certification, who in turn, using the permission system, issues limited certifications to NAs that allow the NAs to issue USPCCs. The member may be an executive owner of the LAN 1, who in turn is granted the privilege to grant the permission to at least one NA or other equivalent agent.

Referring to FIG. 5, in step 320 as shown in FIG. 4, the ASG 4 stores the certificate 52 and the USPCCs 51 on the LAN 1 and enables NAs to manage certificates 52 and 51 by giving users a user status: active, suspended, or deleted. Turning to FIG. 2, the USPCC 51 is made of user information 202, information relating to the source of the certificate 203, the ACS certificate 52, and the permission of file format granted by the NA 204. It is understood by one of ordinary skill in the art that while the user information 202 may include a plurality of information sufficient to identify the owner of the newly issued USPCC 51. In one embodiment, identifying information may be the corporate name, the LAN location, the actual LAN name, a user name, a password, a user location, an identity, a remote server IP address, an IP location of a remote user, or a user codename. The permission 204 also includes information relating to the source of the information 203, such as the ITE name and date of issuance, and the NA name and date of issuance. It is understood by one of ordinary skill in the art that while a source of information 203 may be added to the USPCC, it is not required, though other source information, such as specific ASG 3 and ACS 4 information, may be added.

As shown in FIG. 2, the permission 204 can also include granting access to one or a plurality of data transfer types, such as access to the LAN servers 18, access to a domain 8, access to specific websites 21, access to file servers 6, access to other user communication devices 17, access to other remote users 50, or other functional access to networks or data management structures. The data types may include collaboration services, voice-over-Internet services, SIP voice, File Transfer Protocol, Internet messaging, imagery, FM communication, transfer of e-mail, grant of e-mail sending with and without attachments, and receiving e-mail with the right to send or receive attachments in different formats or any other data type. The system also grants permissions for Telnet or any other type of use where data is ultimately transferred.

As illustrated in FIG. 3, the CA in one embodiment also serves as the third-party provider of the ACS 3 and of the ASG 4 to be mounted within the LAN 1. It is understood that while the same third party may serve as the CA and the provider of the ACS 3, the ASG 4, and the associated services, it is possible to use a third party only for the issuance of the certificate by the ACS 3 and supply the LAN ITE with a system where the ASG 4 works independently of the information stored on the ACS 3 or any other suitable configuration.

Figure 7:
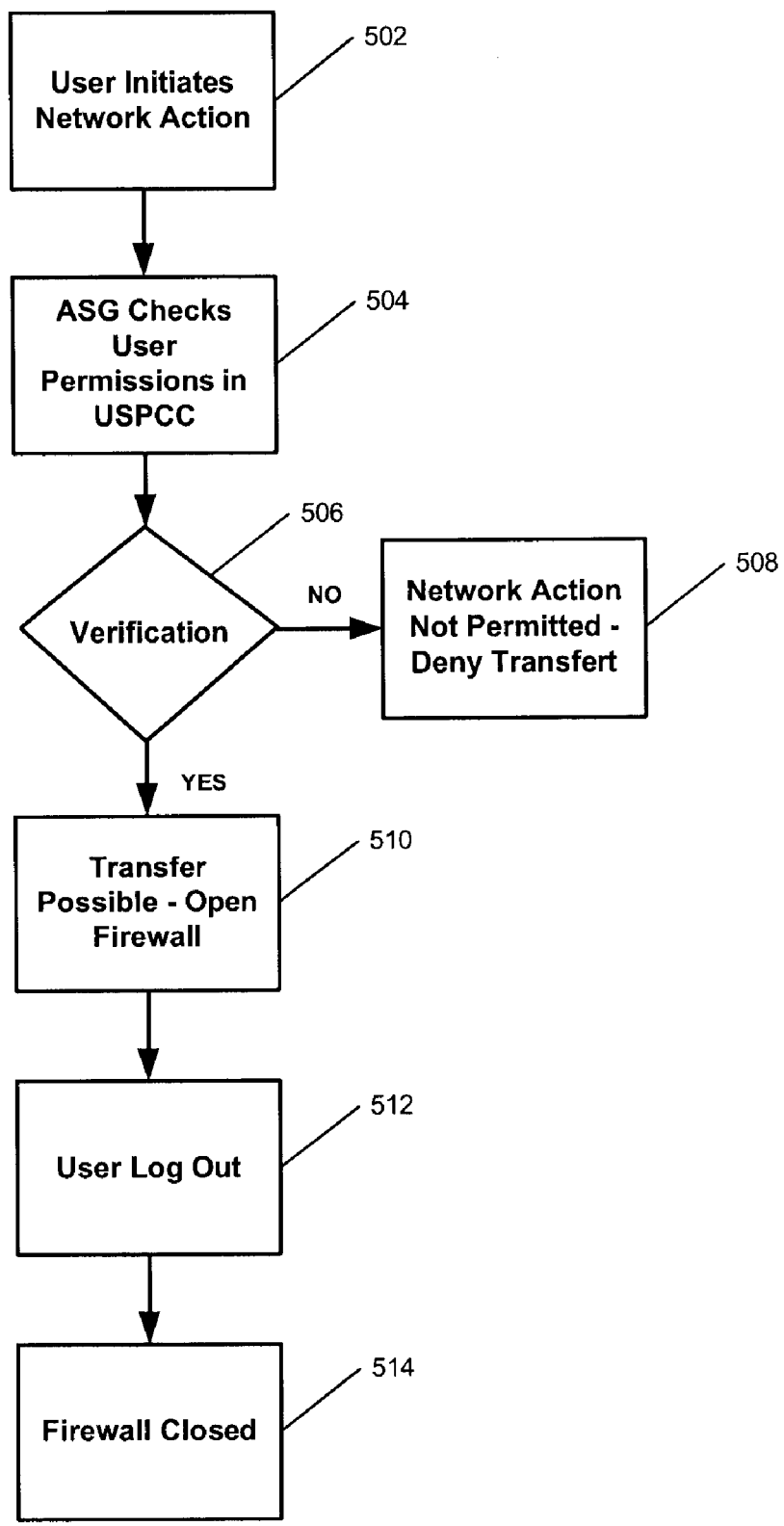
FIG. 7 is a flowchart illustrating the different steps associated with the user operation in association with the method and apparatus for managing the transfer of data over a LAN and a remote network using certification technology.
Figure 8:
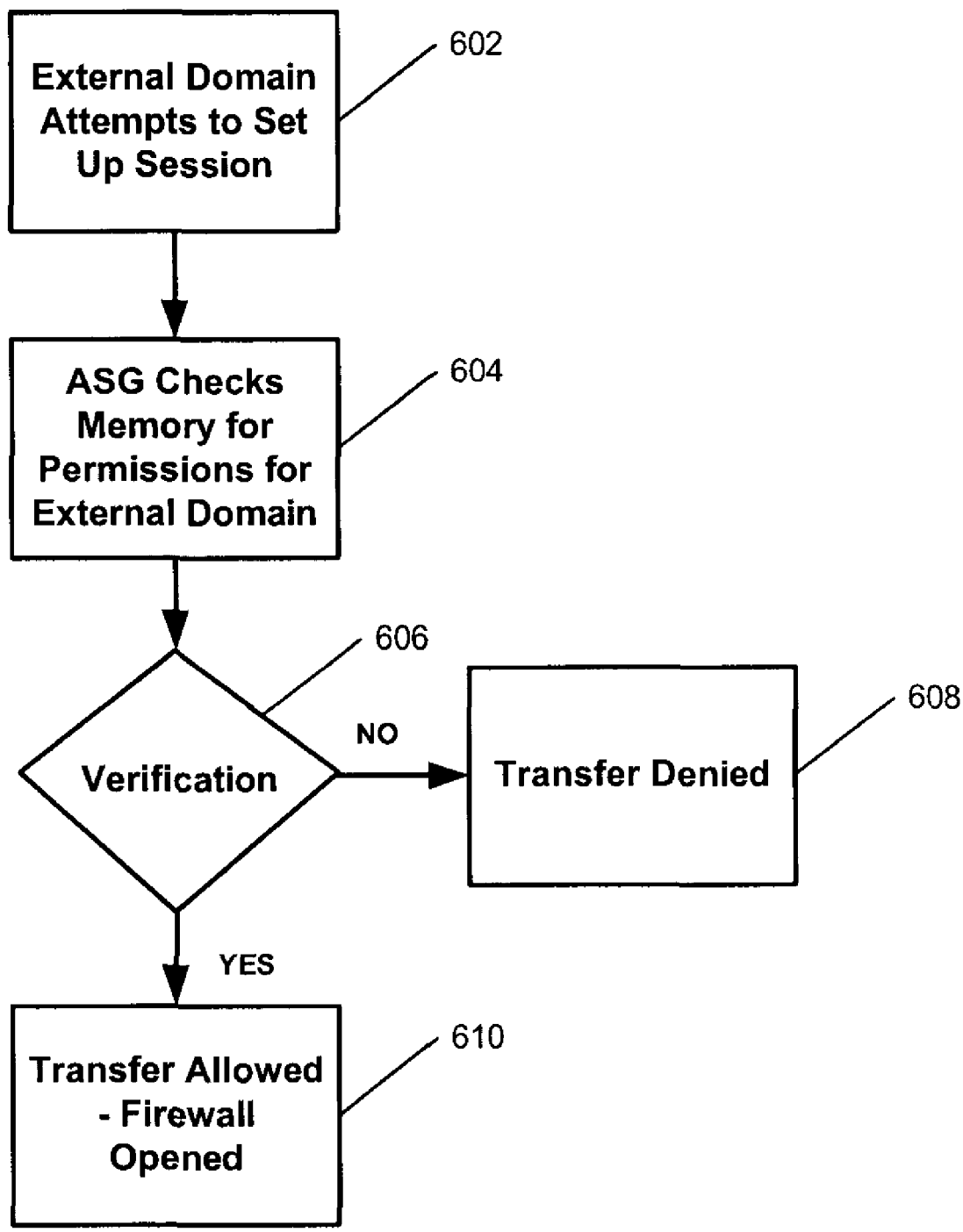
FIG. 8 is a flowchart illustrating the different steps association with the interdomain connections in association with the method and apparatus for managing the transfer of data over a LAN and a remote network using certification technology.

Referring to FIG. 3, the member provides information to the ACS 3 functionally connected via link to the remote network 2 or in one possible embodiment the World Wide Web, also known as the Internet. The ASG 4 also provides function as a data-blocking hardware device, and in a preferred embodiment, and the ASG 4 serves as an Internet firewall device strategically placed at the entry of the LAN 1 from the remote network 2. FIG. 7 shows how transfer information at the ASG 4 using the USPCC 51 can be coordinated and verified 506 with the opening and closing of the firewall. A user must log out 512 before the firewall is closed 514. FIG. 8 illustrates the different steps associated with the opening 610 of the firewall as placed on the ASG 4 to coordinate data transfer between a LAN communication device 17 and an external domain and servers 8, a website host and Internet service provider 21, a remote user 7, a file server 6, or even the remote server 3. In a first step, the external domain attempts to set up a work session 602, and the ASG 4 checks the second memory 53 as shown in FIG. 4 for the permission 204 as found in the USPCC 51 stored in the second memory 53. If the transfer is acceptable 606 based on the permission 204 granted to the user, then the transfer is allowed and the firewall is opened 610. If any conflict is found, then the transfer is denied 608. In another embodiment, the LAN gateway 4 opens the firewall once the permission 204 associated with the USPCC 51 for the external domain 8 is checked and found in the second memory 56 under the list of trusted domains and websites.

For example, one user either located within the LAN 1 or on the remote network 2 may have an unrestricted right to use the Internet, while another user may have the right to send and received e-mail but not send or receive e-mail attachments, and a yet another user may be allowed only to access the information on selected servers on the local computer network based upon the content of the USPCC 51. Network owners must be able to administer these rights regardless of which device a user may be using; whether a user is at his or her office, at another of the organization's offices, traveling, or working from home. The NA must be able to suspend these rights granted and codified in the USPCC 51 if a user leaves on extended leave or is terminated due to a change in the nature of the employment of the user. The NA must also be able to control the access to networks by individuals and organizations other than intended users.

Turning to FIG. 4, the USPCC 51 is sent by the ACS 3 to the ASG 4 via a communication port and the USPCC 51 is stored in the second memory 53 by the ASG 4 as shown in FIG. 4. For each user 50 (shown as user A, B, . . . X) of the LAN 1, a USPCC 51 allows the NA to regulate the transfer of data streams over the LAN by matching with each type of access requested over the ASG 4 to the permission 204 granted to the user in order to regulate access. For instance, a user may be granted a permission 204 to receive e-mail with attachments. This specific USPCC 51 is stored in the ASG 4 second memory 53 and must be accessed to validate the receiver of the information. The same process is used when a remote user 7 on the remote network 2 requests access over the LAN-based network. When a second user sends such an e-mail with attachment to the first user, the ASG 4 looks at the origin of the encrypted message and reviews the associated USPCC 51 to see if the second user is given permission to send e-mail with attachments as found in his or her permission 204. It is understood by one of ordinary skill in the art of computer programming that, while management of the information to be transferred can be made by the ASG 4, the functions of control can be dispatched at the remote user communication devices holding the information in memory. The use of the ASG 4 to coordinate the flow of information by indexing the plurality of USPCC 51 stored is shown in one of the preferred embodiments. This regulation method can also vary according to the specific needs of the LAN 1 or remote users 7 as located on the remote network 2 using the LAN 1.

The ASG 4 allows a first user to send over the LAN 1, either internal to the LAN 1 or in direct data communication with the remote network 2, a data stream in a first format, or based on a first permission 204, coinciding with the format allowed to be received by a second user in its USPCC 51. In another embodiment, FIG. 3 illustrates a LAN 1 further comprising a router 14 situated between the remote network 2 and the ASG 4 for receiving data from a remote network 2 or other sources 3, 6, 7, 8, and 21 located on the remote network 2. A series of switches 15 are used to regulate data transfer between the user communication devices 17, the ASG 4, and the network server 18. It is understood by one of ordinary skill in the art that while only two configuration of LAN 1 with router 14, switches 15 and user communication devices 17 are shown, the structures and possible configurations of a LAN 1 vary based on the specific requirements of the LAN owners. The addition and subtraction of elements from the LAN does not affect the present disclosure as far as the functions described herein may be used and implemented.

In yet another embodiment, FIGS. 3 and 4 illustrate an apparatus for managing the transfer of data over a LAN 1 or through the remote network 2 using certification technology, the apparatus having a LAN 1 having a LAN gateway 4 and at least two LAN communication devices 17 for use by a plurality of users 50, each LAN communication device 17 in data communication with the LAN gateway 4, wherein the LAN gateway 4 is in data communication with an external network 2 and a remote server 3. The remote server 3 in data communication with the LAN gateway 4 and the external network 2, having a first memory 54 for storing after issuance and at the request of the LAN gateway 4 a plurality of certificates 52 and a plurality of associated USPCCs 51 for the plurality of users 50, where each USPCC 51 comprises at least a permission 204 for a data transfer related to a specific user 50 in a first format to and from the LAN communication device 17 and where the LAN gateway 4 includes a having a second memory 53 for storing after reception from the remote server 3 the plurality of certificates 52 and the USPCCs 51. The LAN gateway 4 also allows for the transfer of data in the first format at the request of the specific user 50 using one of the LAN communication devices 17 associated with the permission 204 in the USPCC 51 associated with the specific user 50.

The apparatus comprises a remote server ACS 3 for issuing and storing a certificate 52 and a plurality of USPCCs 51 within a memory storage 54. The ACS 3 is connected to a remote network 3 or the Internet and is operatively connected to a ASG 4 either directly or via an equivalent system such as a router 14, a communication device 17 equipped with a router 14, or the like. The LAN gateway ASG 4 is used for the receipt and storage within a memory storage 53 of the certificate 52 and the USPCC 51. The apparatus further comprises a LAN 1 with at least two user communication devices 17 operatively connected 56 to the ASG 4 capable of transfer of a stream of data in a plurality of formats between the user communication devices 17. The ASG 4 also allows for the transfer of data after an initial request from the remote server ACS 3 of the issuance of a USPCC 51 granting permission for the transfer of a data stream by a specific user in at least one of a plurality of formats. The ASG 4 also stores the USPCC 51 and allows for the transfer of the data stream only if the permission 204 is granted to the LAN 1 based user or the remote network 2 user in the desired format.

In one embodiment, the second memory 53 further includes a status information related to each specific user used by the NA to control the status of each user, such as, for example, active, suspended, or deleted. The use of status information may be used as an additional step in the process of the verification before any data transfer is authorized.

It is understood by one of ordinary skill in the art that these steps and the apparatus and system disclosed herein correspond to the general steps and elements associated with the practice of this method and the use of the system and apparatus. Those of ordinary skill in the art appreciate that, although the teachings of the disclosure have been illustrated in connection with certain embodiments and method, there is no intent to limit the invention to such embodiments and method. On the contrary, this application is intended to cover all modifications and embodiments falling fairly within the scope of the teachings of the disclosure.

What is claimed is:

1. A method for managing the transfer of data over a local area network (LAN) using certification technology, the method comprising the steps of:
providing a member of a LAN with a LAN gateway to be installed on the LAN where a plurality of LAN communication devices are in data communication with an external network;
allowing the member to apply for a certificate to a certification authority located on a Remote Certificate Server (ACS) with a first memory used in tandem with the LAN gateway, the
certificate for each of a plurality of users of the LAN;
upon verifying, at the ACS, an information provided by the member, issuing certificates;
managing issued certificates from the certification authority at the LAN gateway;
storing in the first memory of the ACS of a remote server the certificates;
storing in a second memory of the LAN gateway the certificates;
granting the member of the LAN a privilege of issuing a permission to be imbedded in a associated user-specific, permission-coded certificate (USPCC) relating to a capacity by at least one user of the LAN to transfer a stream of data in a first format using a LAN communication device, wherein the USPCC comprises the certificate, a user information, a source, and at least one permission;
using, at the ACS, the permission sent by the member to create a USPCC, which is sent to ASG;
storing the USPCC in the first memory and the second memory; and
allowing the transfer of data from or to the at least one LAN communication device used by the
user in the first format based on the permission imbedded in the USPCC.

2. The method of claim 1, wherein the method further comprises the steps of allowing the member to determine a list of trusted domains and accepted websites accessed by the at least one user of the LAN and storing on the first memory and the second memory the list.

3. The method of claim 2, wherein the method further comprises the step of allowing at least one user to access the trusted domains and accepted websites if they coincide with the format allowed under the permission associate with the USPCC.

4. The method of claim 3, wherein the LAN gateway opens a firewall once the permission associated with the USPCC for the external domain is checked in the second memory.

5. The method of claim 1, wherein the privilege granted by the certification authority to the member is to an executive owner of the LAN who in turn is allowed to grant the privilege to at least one local network manager.

6. The method of claim 1, wherein the user information comprises one of a corporate name, a user location, a name, a password, an identity, or a user codename sufficient to identify the user of the LAN.

7. The method of claim 1, wherein the source is a name and an associated date of a request for the issuance of the USPCC of the member of the local network authority.

8. The method of claim 1, wherein the first format is selected from a group consisting of a format for access to other local area network servers, collaboration services, file transfer protocol services, an Internet live messenger, e-mail, e-mail attachments, voice-over-Internet files, telnet, and data transfer.

9. The method of claim 1, wherein the LAN further comprises a router situated in the flow of data between the external network and the LAN gateway, and a series of switches situated in the flow of data between the LAN gateway and the LAN communication devices.

10. The method of claim 1, wherein the external network is the World Wide Web, also known as the Internet.

11. The method of claim 1, wherein the LAN gateway also serves as a data blocking hardware device.

12. The method of claim 11, wherein the data blocking hardware device is a firewall.

13. The method of claim 12, wherein an opening is made in the firewall once the user permission in the USPCC is checked by the LAN gateway.

14. The method of claim 13, wherein the opening in the firewall is closed after the user has logged out.

15. The method of claim 1, wherein the second memory further includes a status information related to each specific user.

16. The method of claim 15, wherein the status information can be either active, suspended, or deleted.

17. The method of claim 1, wherein the AGS logs users in and returns a permissions summary after validating a system check and confirming the user status using the certificate.

18. An system for managing the transfer of data over a local area network (LAN) using certification technology, the apparatus comprising:
a LAN having a LAN gateway and at least two LAN communication devices for use by a plurality of users, each LAN communication device in data communication with the LAN gateway, wherein the LAN gateway is in data communication with an external network;
a Remote Certificate Server (ACS) used in tandem and in data communication with the LAN gateway and the external network, the ACS for issuance of certificates as a certification authority and having a first memory for storing after issuance and at the request of the LAN gateway a plurality of certificates and a plurality of associated user-specific, permission-coded certificates (USPCC) for the plurality of users, wherein each USPCC comprises a user certificate, a user information, a source, and at least a permission for a data transfer related to a specific user in a first format to and from the LAN communication device; and
wherein the LAN gateway having a second memory for storing after reception from the remote server the plurality of certificates and the USPCC, and
wherein the LAN gateway allows for the transfer of data in the first format at the request of the specific user using one of the LAN communication devices associated with the permission
in the USPCC associated with the specific user.

19. The system of claim 18, wherein the user information comprises at a minimum a corporate name, a user location, a name, a password, an identity, or a user codename, or any combination thereof sufficient to identify the user of the specific user.

20. The system of claim 18, wherein the source information is a name and an associated date of a request for the issuance of the USPCC of a LAN executive or manager.

21. The system of claim 18, wherein the first format is selected from a group consisting of a format for access to other local area network servers, collaboration services, file transfer protocol services, an Internet live messenger, e-mail, e-mail attachments, voice-over-Internet files, telnet, and data transfer.

22. The system of claim 18, wherein the LAN further comprises a router situated in the flow of data between the external network and the LAN gateway, and a series of switches situated in the flow of data between the LAN gateway and the LAN communication devices.

23. The system of claim 18, wherein the external network is the World Wide Web, also known as the Internet.

24. The system of claim 18, wherein the LAN gateway also serves as a data blocking hardware device.

25. The system of claim 24, wherein the data blocking hardware device is a firewall.

26. The system of claim 18, wherein the second memory further includes a status information related to each specific user.

27. The system of claim 26, wherein the status information can be either active, suspended, or deleted.

28. A method for granting a local area network (LAN) communication device user access to a list of trusted domains and accepted websites, the method comprising the steps of:
  allowing a member to apply to a Remote Certification Server (ACS) used in tandem with a LAN gateway having a first memory for issuance of a plurality of certificates;
  conducting a verification of an information by the remote server of application information of the member and responding to the member with a username, a password, and a certificate only if the verification is successful;
  sending to the LAN gateway a list of trusted domains and accepted websites determined by the member;
  allowing the member to log into the ACS for issuance of certificates to a LAN executive or manager;
  permitting the LAN executive or manager to log into the ACS to issue a user-specific, permission-coded-certificate (USPCC) to the LAN gateway, wherein each USPCC comprises a user certificate, a user information, a source, and at least a permission for a data transfer related to a specific user in a first format to and from the LAN communication device; and
  sending to the LAN gateway the USPCC for granting access to the list of trusted domains and accepted websites determined by the member.

29. The method of claim 28, wherein the method further comprising the step of allowing the LAN executive or manager to administer the different certificates and USPCC.

30. The method of claim 29, wherein the different certificates are either active, suspended, or deleted.

* * * * *